(12) United States Patent
Tsuchida

(10) Patent No.: US 9,383,960 B2
(45) Date of Patent: Jul. 5, 2016

(54) VIDEO DISPLAY DEVICE, DISPLAY CONTROL METHOD

(71) Applicant: Kabushiki Kaisha Toshiba, Minato, Tokyo (JP)

(72) Inventor: Masaki Tsuchida, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 241 days.

(21) Appl. No.: 14/274,921

(22) Filed: May 12, 2014

(65) Prior Publication Data

US 2015/0130684 A1 May 14, 2015

Related U.S. Application Data

(60) Provisional application No. 61/903,237, filed on Nov. 12, 2013.

(51) Int. Cl.
G06F 3/14 (2006.01)

(52) U.S. Cl.
CPC ........ *G06F 3/1446* (2013.01); *G09G 2300/026* (2013.01); *G09G 2310/0232* (2013.01); *G09G 2356/00* (2013.01)

(58) Field of Classification Search
None
See application file for complete search history.

(56) References Cited

U.S. PATENT DOCUMENTS

| 6,115,092 A | 9/2000 | Greene et al. |
| 6,370,019 B1 | 4/2002 | Matthies et al. |
| 8,872,733 B2 * | 10/2014 | Yoshimura ........... G09G 3/3426 345/1.3 |

FOREIGN PATENT DOCUMENTS

| JP | 2003509722 A | 3/2003 |
| JP | 2010015163 A | 1/2010 |
| JP | 2013097053 A | 5/2013 |

* cited by examiner

*Primary Examiner* — Abbas Abdulselam
(74) *Attorney, Agent, or Firm* — Patterson & Sheridan, LLP

(57) ABSTRACT

According to one embodiment, a video display device includes a display panel and a light source modules, for example. The display panel includes a video display area capable of displaying video and is arranged adjacent to another display panel. The light source module includes a light source that irradiates the video display area with light. The light source module is configured to control an amount of light irradiated against the video display area such that a first area located on a side of a border with the other display panel is brighter than a second area other than the first area in the video display area.

6 Claims, 7 Drawing Sheets

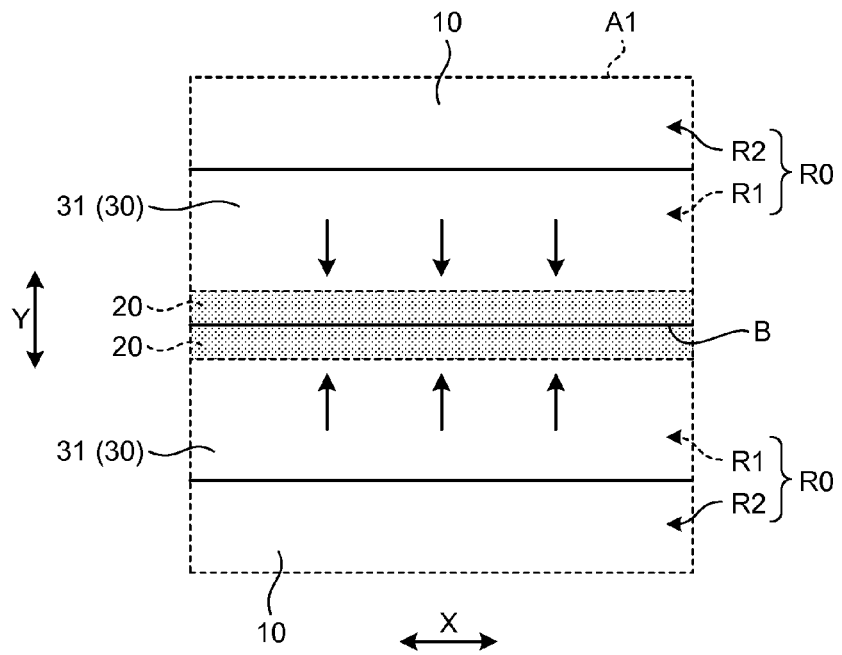
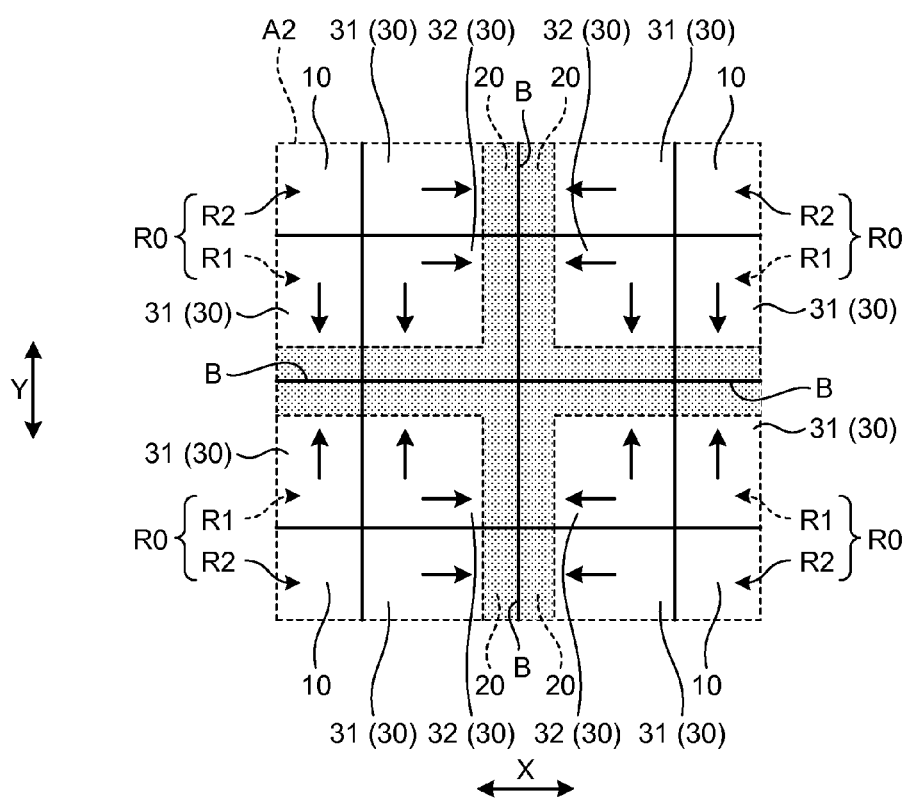

VIDEO DISPLAY DEVICE, DISPLAY CONTROL METHOD

CROSS-REFERENCE TO RELATED APPLICATIONS

This application claims the benefit of U.S. Provisional Application No. 61/903,237, filed Nov. 12, 2013.

FIELD

Embodiments described herein relate generally to a video display device and a display control method.

BACKGROUND

Conventionally, there have been known techniques that configure a video display device capable of displaying a continuous large video by arranging a plurality of display panels so as to be adjacent to each other.

In such techniques, light from light sources included in the video display device hardly reaches areas near the borders of the plurality of display panels. This tends to make the parts corresponding to the borders in a continuous large video relatively darker than the other parts.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary schematic diagram to explain a magnification direction of a video by liner lenses (optical elements) of the tiling display illustrated in FIG. 2, in the embodiment;

FIG. 4 is an exemplary schematic diagram to explain a magnification direction of a video by circular lenses (optical elements) of the tiling display illustrated in FIG. 2, in the embodiment;

DETAILED DESCRIPTION

According to an embodiment, a video display device generally comprises a display panel and a light source module, for example. The display panel comprises a video display area capable of displaying a video and is arranged adjacently to another display panel. The light source module comprises a light source that irradiates the video display area with light. The light source module is configured to control an amount of light irradiated against the video display area such that a first area located on a side of a border with the other display panel is brighter than a second area other than the first area in the video display area.

The following specifically describes the embodiment with reference to the accompanying drawings.

An example of a configuration of a video display system 1000 comprising a tiling display 150 according to the embodiment is described with reference to FIGS. 1 to 8. The tiling display 150 is an example of a "video display device".

Figure 1:
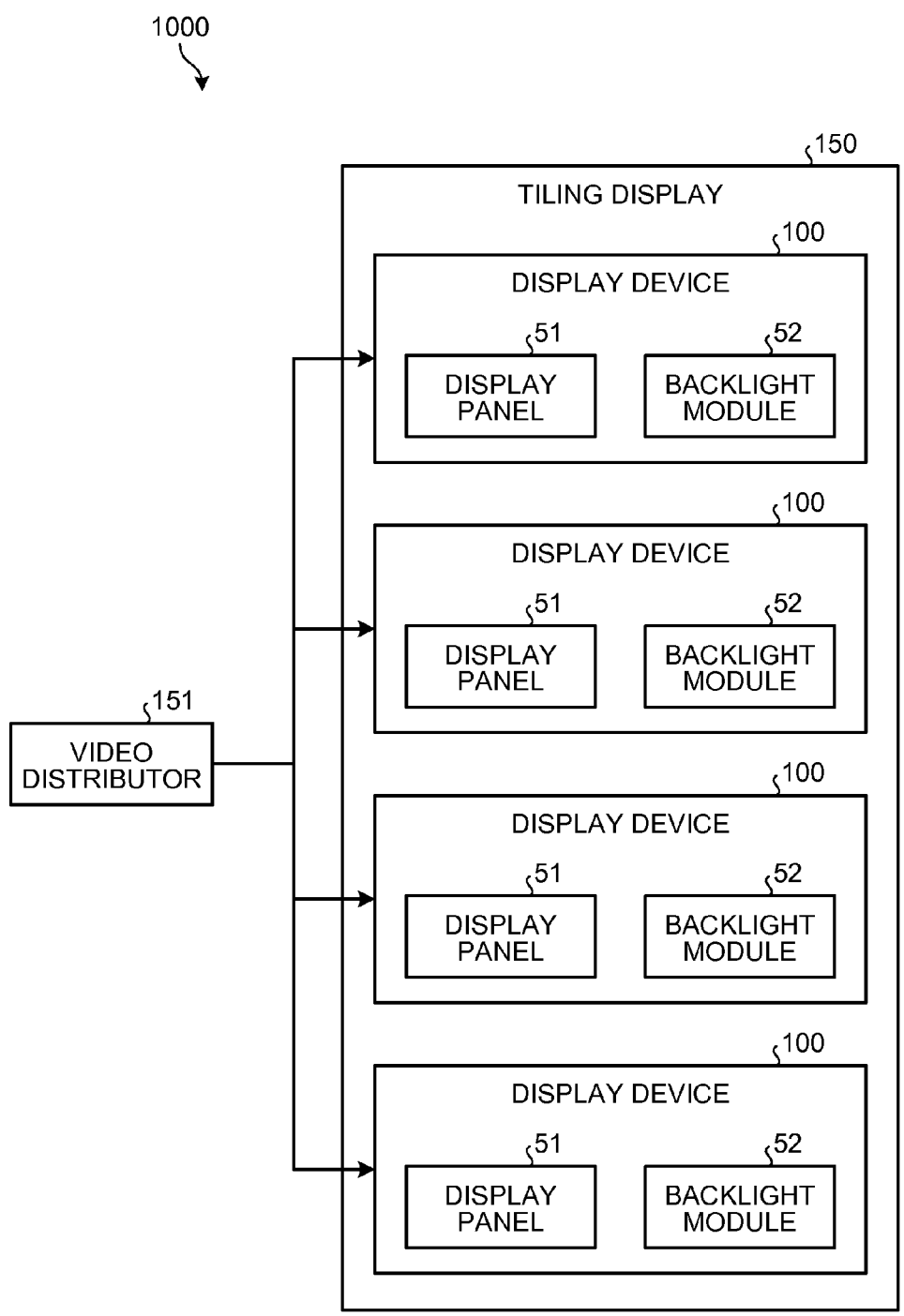
FIG. 1 is an exemplary block diagram illustrating an overall configuration of a video display system according to an embodiment.

As illustrated in FIG. 1, the video display system 1000 comprises the tiling display 150 and a video distributor 151. The tiling display 150 comprises a plurality of (four) display devices 100. The video distributor 151 has a function to distribute and output a video to the four display devices 100 that configure the tiling display 150.

Each of the four display devices 100 is not a self-light-emitting video display device but a transmissive or reflective video display device. Such a video display device generally comprises a light source module besides the display panel. In the embodiment, the four display devices 100 each comprise a display panel 51 and a backlight module 52. The backlight module 52 is an example of a "light source module". The backlight module 52 is configured to irradiate the display panel 51 with light from the rear side of the display panel 51.

Figure 2:
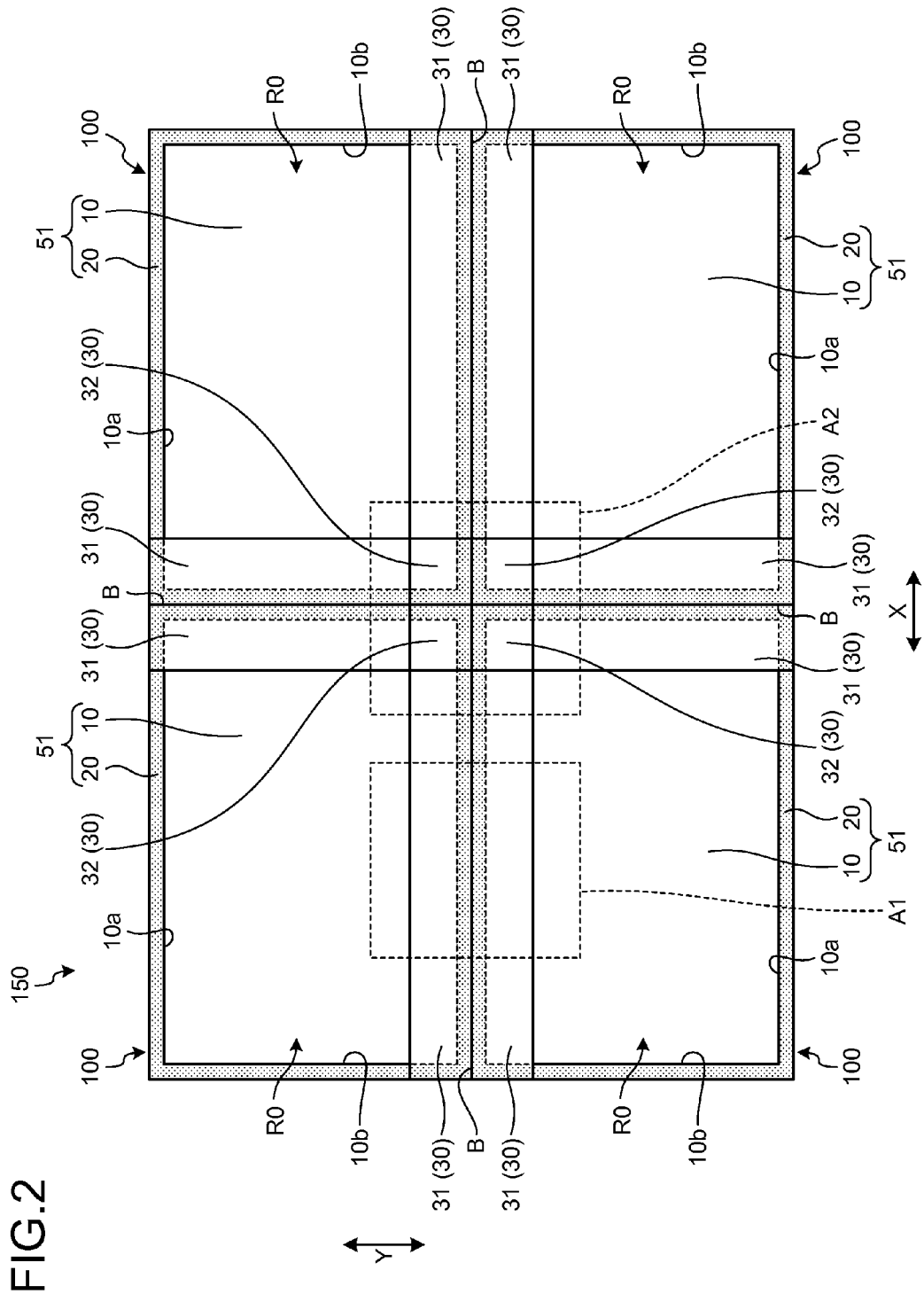
FIG. 2 is an exemplary schematic diagram illustrating a tiling display in the embodiment.

As illustrated in FIG. 2, the four display devices 100 are arranged so as to be adjacent to each other. Specifically, the four display devices 100 are arranged in a tiled array in which two of the display devices 100 are arranged side by side in a horizontal direction (X direction) and two of the display devices 100 are arranged side by side in a vertical direction (Y direction). With the four display devices 100 thus arranged in a tiled array, the tiling display 150 is configured that can display a continuous large video.

The four display devices 100 each comprise a display module 10, a frame 20, and an optical element 30. The display module 10 is a liquid crystal display module, for example. The display module 10 has a video display area R0 having a rectangular shape (oblong shape). The video display area R0 has long sides 10a extending in the X direction and short sides 10b extending in the Y direction. The frame 20 is provided so as to surround the outer circumference (outer edge) of the display module 10 as illustrated as the dotted mesh area in FIG. 2. The frame 20 is provided so as to extend along the long sides 10a and the short sides 10b of the video display area R0. The display panel 51 is configured by the display module 10 and the frame 20.

There is a demand to prevent the frames 20 of the tiling display 150 described above from being viewed by a viewer when the tiling display 150 displays a continuous large video. For example, there is a demand to prevent a cruciform joint formed by the frames 20 provided so as to correspond to borders B of the four display devices 100 from being viewed from a viewer.

Thus, the embodiment prevents the frames 20 from being viewed by a viewer by providing the optical elements 30 that cover the borders B of the four display devices 100 and enlarging videos displayed in first regions R1 (refer to FIGS. 3, 4, 7, and 8) in the video display areas R0 toward the frames 20 by the optical elements 30. As a result, the tiling display 150 configured by the four display devices 100 functions as a single display that can display a continuous large video.

The first area R1 is the area that is located on the border B side and overlaps with the optical element 30 in the video display area R0. In the embodiment, the display module 10 is configured to output, to the first area R1, a video reduced with a reduction ratio corresponding to a magnifying power of the optical element 30 such that an unbroken video is viewed by a viewer even when the video is magnified by the optical element 30.

In the embodiment, the optical element 30 is configured by the combination of linear lenses 31 provided along the borders B formed in a cross shape and circular lenses 32 provided at the crossing area of the borders B formed in a cross shape. The linear lenses 31 and the circular lenses 32 are arranged so as to be apart from the display panel 51 with a certain distance.

FIG. 3 is a schematic diagram to explain a magnification direction of a video by the linear lenses 31. In FIG. 3, a rectangular area A1 is illustrated by being enlarged. The rectangular area A1 is located on one side (left side) in the X direction and near the central area in the Y direction of the tiling display 150 illustrated in FIG. 2. As illustrated in FIG. 3, the linear lenses 31 are configured to magnify a video output from the first area R1 only in one direction (refer to the arrows).

FIG. 4 is a schematic diagram to explain a magnification direction of a video by the circular lenses 32. In FIG. 4, a rectangular area A2 is illustrated by being enlarged. The rectangular area A2 is located near the central area in the X direction and the Y direction of the tiling display 150 illustrated in FIG. 2. As illustrated in FIG. 4, the circular lenses 32 are configured to magnify a video output from the first area R1 in two directions (refer to the arrows).

In the tiling display 150 described above, no light is incident on the display panel 51 of a certain display device 100 from a backlight module 52 of the adjacent display device 100 because the four display devices 100 are provided independently from each other with the borders B interposed therebetween. As a result, in each display panel 51, an amount of incident light from the backlight module 52 in the first area R1 is smaller than that in an area near the central area of the display panel 51.

Consequently, in the tiling display 150 described above, a video displayed in the first area R1 tends to be viewed darker than a video displayed in a second area R2 (refer to FIGS. 3, 4, 7, and 8) other than the first area R1. The video displayed in the first area R1 tends to be viewed dark particularly in the configuration of the embodiment in which the optical element 30 is provided at the position corresponding to the border B because the video displayed in the first area R1 is viewed through the optical element 30.

Thus, the embodiment adopts the backlight module 52 that is configured to be capable of controlling an amount of light irradiated against the video display area R0 such that the amount of light differs among a plurality of areas (rectangular areas R3 described later) provided by dividing the video display area R0, as an example of a configuration that causes a video displayed in the first area R1 to be viewed bright. Using the backlight module 52, an amount of light irradiated against the video display area R0 is controlled such that the first area R1 becomes brighter than the second area R2.

Figure 5:
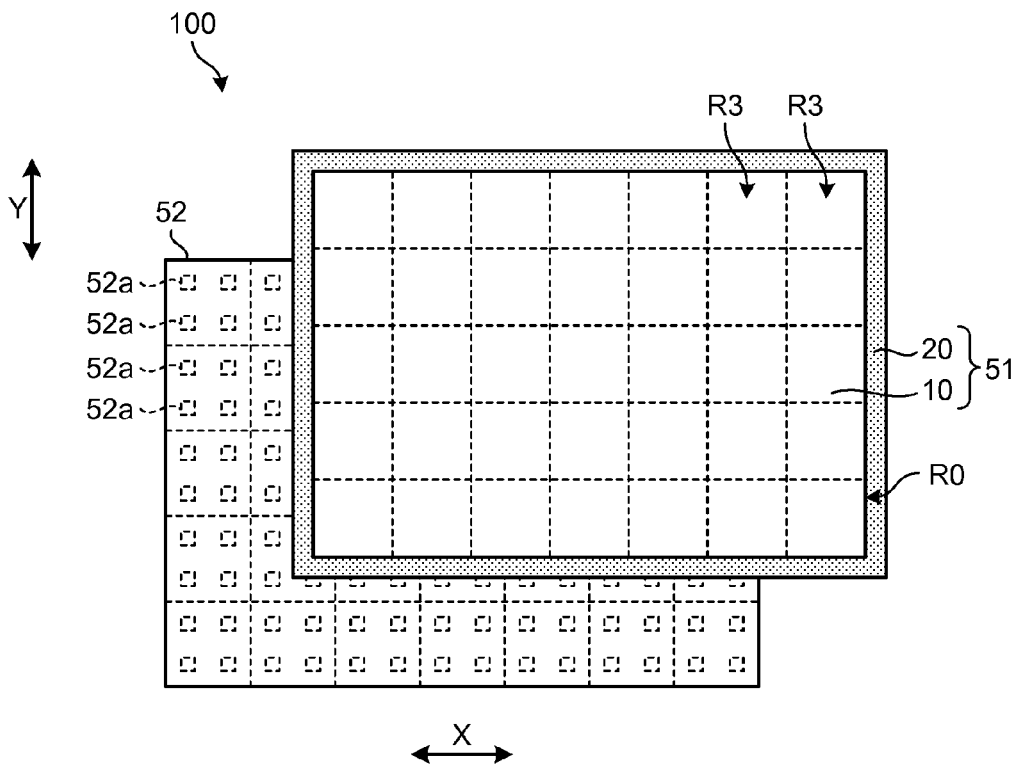
FIG. 5 is an exemplary schematic diagram illustrating a display panel and a backlight module comprised in each display device that configures the tiling display illustrated in FIG. 2, in the embodiment.

In the embodiment, as illustrated in FIG. 5, the backlight module 52 comprises a plurality of light-emitting elements 52*a* that are configured to irradiate the display panel 51 with light from the rear side of the display panel 51. The light-emitting elements 52*a* are provided so as to cover substantially the entire area of the video display area R0. The backlight module 52 is configured to be capable of controlling an amount of light irradiated against the video display area R0 such that the amount of light differs among the multiple rectangular areas R3 by individually controlling lighting values of the multiple light-emitting elements 52*a*.

The rectangular areas R3 are the areas provided by dividing the video display area R0 in the X direction (scanning direction of a video) and the Y direction (direction orthogonal to the scanning direction). In the example illustrated in FIG. 5, the light-emitting elements 52*a* are provided such that four light-emitting elements 52*a* are allocated to each rectangular area R3. The backlight module 52 illustrated in FIG. 5 is configured to be capable of controlling the lighting values of the four light-emitting elements 52*a* per rectangular area R3 such that the lighting values differ among the rectangular areas R3.

By the configuration as described above, the backlight module 52 of the embodiment performs control to provide an amount of light irradiated against the first area to be larger than an amount of light irradiated against the second area is irradiated such that brightness of a video viewed through the optical element 30 and the brightness of the video viewed without passing through the optical element 30 are substantially equal to each other. The following more specifically describes an amount of light (brightness or luminance) irradiated against the display panel 51 (video display area R0) by the backlight module 52 of the embodiment with reference to FIGS. 6 to 8.

Figure 6:
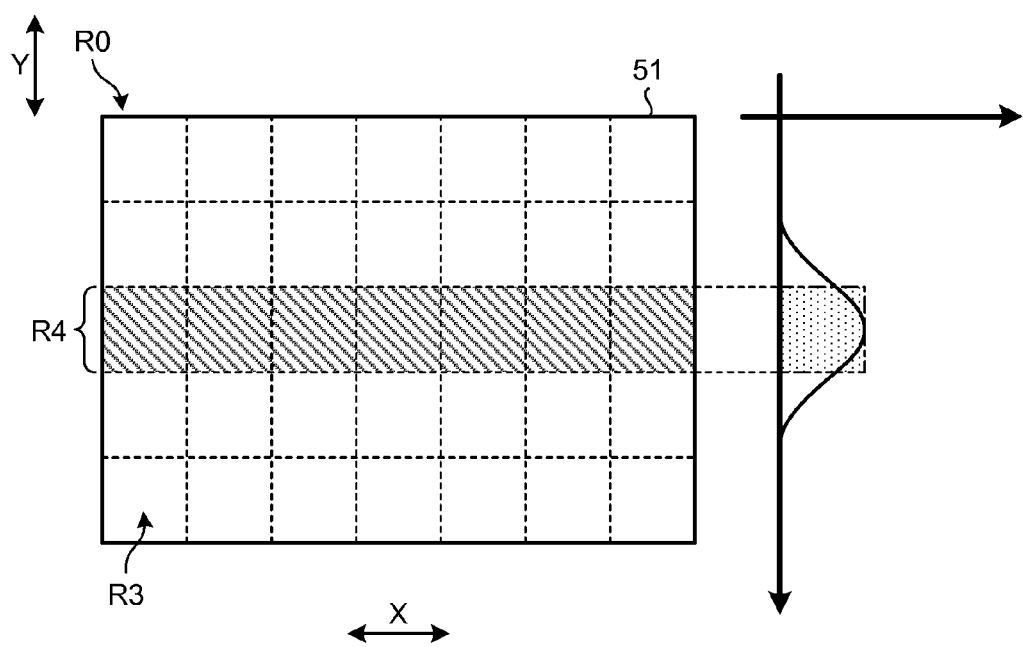
FIG. 6 is an exemplary schematic diagram to explain an amount of light (luminance or brightness) emitted from the backlight module illustrated in FIG. 5, in the embodiment.

FIG. 6 is a schematic diagram to explain an amount of light emitted from the backlight module 52 illustrated in FIG. 5. Specifically, FIG. 6 is a schematic diagram to explain an amount of light irradiated against a zonal area R4 (refer to the shaded area) in the video display area R0. The zonal area R4 is the area (composed of seven rectangular areas R3) that extends in the X direction and is provided by dividing the video display area R0 in the Y direction. In FIG. 6, the frame 20 of the display panel 51 and the like are omitted to simplify the illustration.

FIG. 6 illustrates a case where the lighting values of the multiple light-emitting elements 52*a* provided at the positions corresponding to the zonal area R4 are substantially equal to each other, as an example. In this case, as illustrated in the curved graph with the actual line on the right side in FIG. 6, light from the multiple light-emitting elements 52*a* provided at the positions corresponding to the zonal area R4 has a certain spread capable of being approximated by a Gaussian distribution or an exponent function. The bar graph surrounded with the alternate long and short dash line (refer to the dotted mesh area) on the right side in FIG. 6 represents the brightness of the zonal area R4 in a simple manner.

Figure 7:
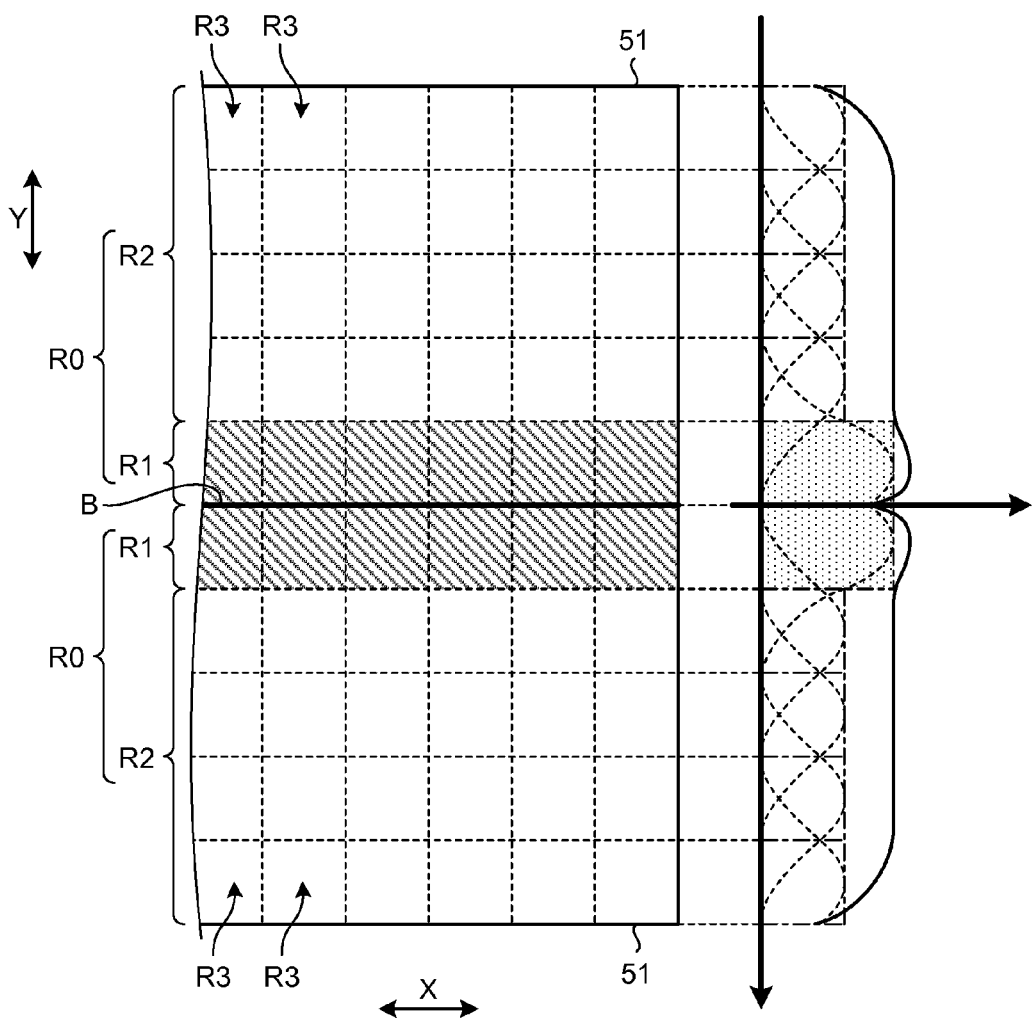
FIG. 7 is an exemplary schematic diagram to explain an amount of light irradiated against the two display panels, which are adjacent to each other in a Y direction in the tiling display illustrated in FIG. 2, in the embodiment.

FIG. 7 is a schematic diagram to explain an amount of light irradiated against the two display panels 51, which are adjacent to each other in the Y direction in the tiling display 150 illustrated in FIG. 2. In FIG. 7, the frames 20 of the display panels 51 and the like are also omitted to simplify the illustration in the same manner as FIG. 6. The curved graph with the actual line illustrated on the right side in FIG. 7 is obtained by summing a plurality of curved graphs with the dotted lines illustrated on the right side in FIG. 7.

As illustrated in the graph on the right side in FIG. 7, the amount of light irradiated against the first area R1 is larger than the amount of light irradiated against the second area R2 in the respective video display areas R0 of the two display panels 10 adjacent to each other in the Y direction with the border B extending in the X direction interposed therebetween. As a result, in the configuration of FIG. 7 that comprises the two display panels 51 adjacent to each other in the Y direction, the video displayed in the multiple rectangular areas R3 (first rectangular area or first area R1) located on the inner side (on a side adjacent to the border B) can be made brighter than the video displayed in the multiple rectangular areas R3 (second rectangular area or second area R2) located on the outer side. Consequently, the brightness of the video viewed through the optical element 30 and the brightness of the video viewed without passing through the optical element 30 can be substantially equalized to each other even when the optical element 30 (not illustrated in FIG. 7, refer to FIGS. 2 to 4) is provided so as to overlap with the first area R1 in the configuration of FIG. 7.

Figure 8:
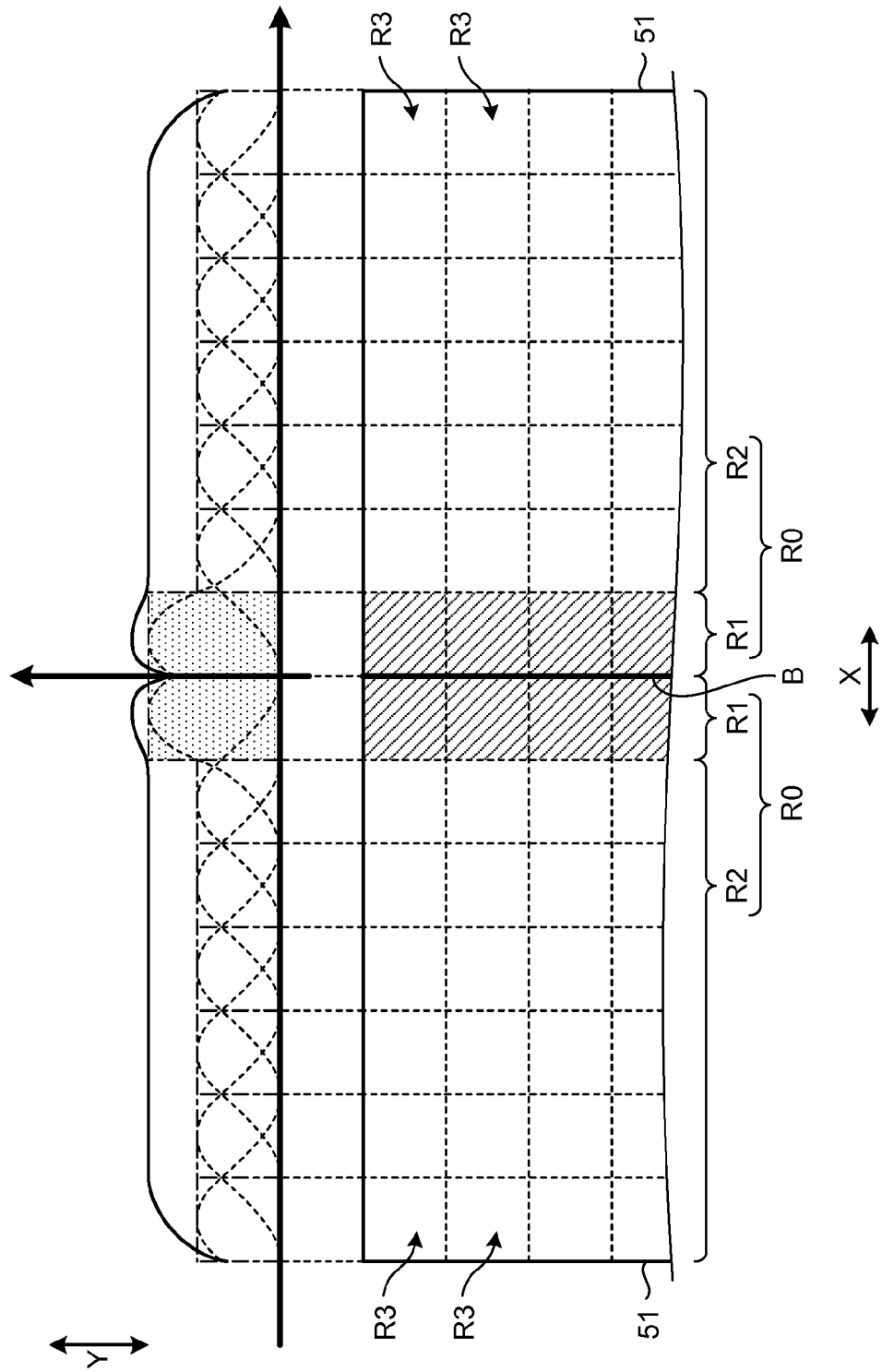
FIG. 8 is an exemplary schematic diagram to explain an amount of light irradiated against the two display panels, which are adjacent to each other in an X direction in the tiling display illustrated in FIG. 2, in the embodiment.

FIG. 8 is a schematic diagram to explain an amount of light irradiated against the two display panels 51, which are adjacent to each other in the X direction in the tiling display 150 illustrated in FIG. 2. In FIG. 8, the frames 20 of the display panels 51 and the like are also omitted to simplify the illustration in the same manner as FIGS. 6 and 7. The curved graph with the actual line illustrated on the upper side in FIG. 8 is obtained by summing a plurality of curved graphs with the dotted lines illustrated on the upper side in FIG. 8.

As illustrated in the graph on the upper side in FIG. 8, the amount of light irradiated against the first area R1 is larger than the amount of light irradiated against the second area R2 in the respective video display areas R0 of the two display panels 51 adjacent to each other in the X direction with the border B extending in the Y direction interposed therebetween. As a result, also in the configuration of FIG. 8 that comprises the two display panels 51 adjacent to each other in the X direction, the video displayed in the multiple rectangular areas R3 (first rectangular area or first area R1) located on the inner side can be made brighter than the video displayed in the multiple rectangular areas R3 (second rectangular area or second area R2) located on the outer side, in the same manner as the configuration of FIG. 7. Consequently, the brightness of the video viewed through the optical element 30 and the brightness of the video viewed without passing through the optical element 30 can be substantially equalized to each other even when the optical element 30 (not illustrated in FIG. 8, refer to FIGS. 2 to 4) is provided so as to overlap with the first area R1 in the configuration of FIG. 8, in the same manner as the configuration of FIG. 7.

As described above, the embodiment can substantially equalize the brightness of the video displayed in the two display panels 51 adjacent to each other in the X direction regardless of the presence of the border B, and can substantially equalize the brightness of the video displayed in the two display panels 51 adjacent to each other in the Y direction regardless of the presence of the border B. Thus, the embodiment can substantially equalize the brightness of the video regardless of the presence of the borders B when a continuous large video is displayed on the tiling display 150 (refer to FIG. 2) that are configured by the four display panels 51 arranged in a tiled array in which the two display panels 51 are arranged side by side in each of the X and the Y directions.

In the display panel 51 described above, a degree of freedom in configuring the tiling display 150 is reduced if the position of the first area R1, in which a relatively bright video is displayed, in the video display area R0 is preliminarily determined. Specifically, assuming that, in the display panel 51 illustrated in FIG. 5, it is preliminarily determined that a video (first video) displayed in 11 rectangular areas R3 (first rectangular area or first area R1) located in the leftmost column and the lowermost row in the video display area R0 becomes brighter than a video (second video) displayed in the other rectangular areas R3 (second rectangular area or second area R2), the display panel 51 illustrated in FIG. 5 cannot be arranged at a position other than the position at the upper right in the tiling display 150 illustrated in FIG. 2. Thus, in the embodiment, the backlight module 52 is configured to be capable of setting an amount of light irradiated against a particular area in the video display area R0 to be relatively large in accordance with the arrangement position of the display panel 51 relative to the other display panels 51. As a result, the first area R1 located on the border B side in the video display area R0 can be made relatively bright regardless of the arrangement position of the display panel 51.

As described above, in the embodiment, the backlight module 52 is configured to control an amount of light irradiated against the video display area R0 such that the first area R1 becomes brighter than the second area R2. The first area R1 is the area that is located on the border B side (area adjacent to the border B) in the video display area R0. The second area is the area other than the first area R1 in the video display area R0. As a result, when a continuous large video is displayed on the tiling display 150 configured by the arranged multiple display panels 51, it can be prevented that the part located on the border B side in the video becomes relatively dark. In the embodiment, the effect described above is obtained by controlling the lighting values of the light-emitting elements 52a comprised in the backlight module 52. The embodiment can thus obtain the effect described above without controlling a video signal applied to liquid crystals or other elements comprised in the display module 10 of the display panel 51 such that the video becomes brighter, for example. It is no doubt that the brightness can be fine-tuned by controlling the liquid crystals when uneven brightness occurs among the areas controlled by the backlight module 52.

Figure 9:
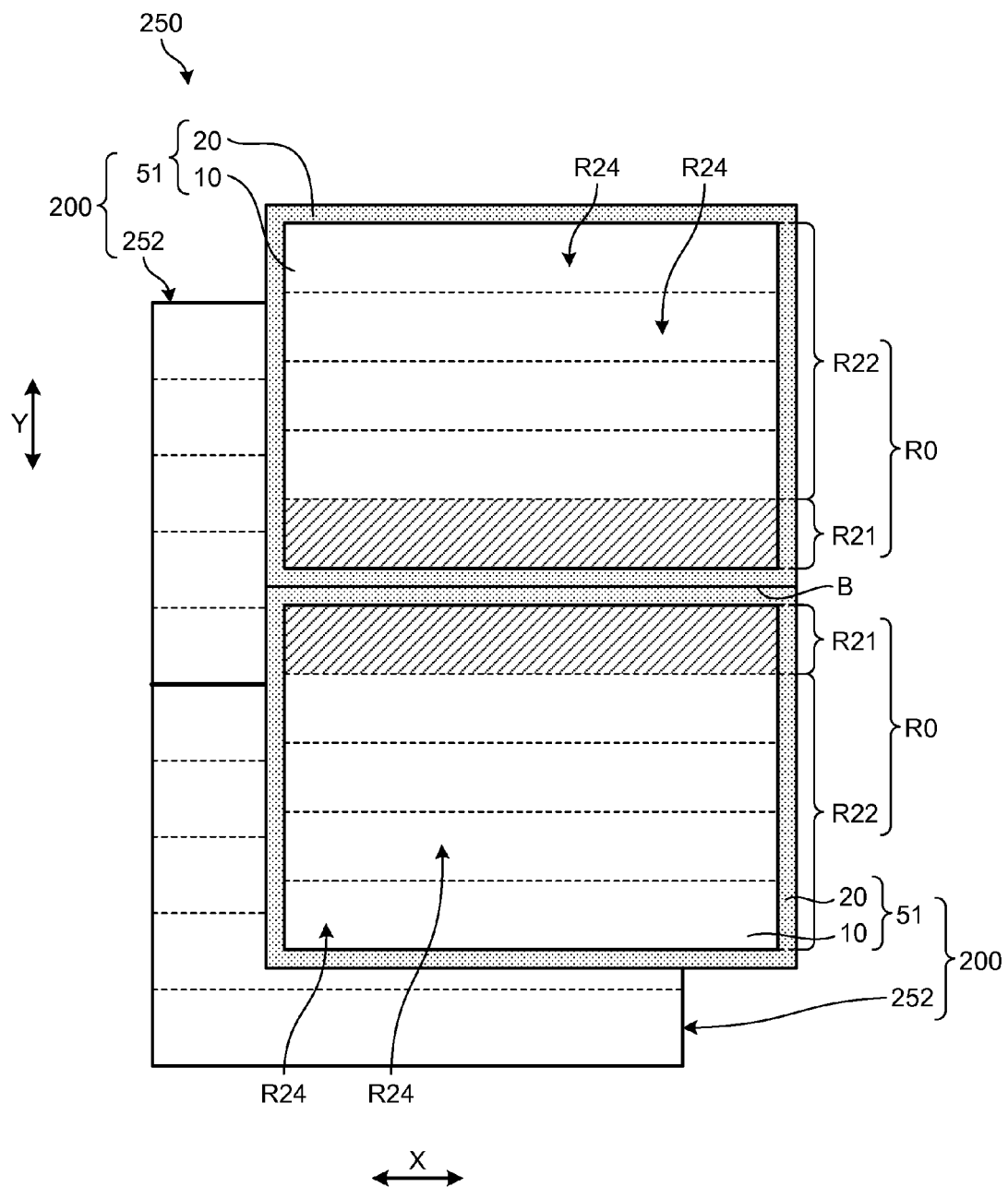
FIG. 9 is an exemplary schematic diagram illustrating a tiling display according to a modification of the embodiment.

The technique of the embodiment described above is applicable to another tiling display other than the tiling display 150 that is configured by arranging the four display panels 51 such that two of the display panels 51 are arranged side by side in each of the X and the Y directions as illustrated in FIG. 2. For example, the technique of the embodiment is also applicable to a tiling display 250, which is illustrated in FIG. 9 as a modification and configured by arranging two display devices 200 (display panels 51) side by side in the Y direction. In a similar way, the technique of the embodiment is applicable to a tiling display comprising three display panels and a tiling display comprising more than four display panels, for example.

The embodiment described above illustrates the configuration as illustrated in FIG. 5 that comprises the backlight module 52 capable of varying an amount of light irradiated against the video display area R0 for each rectangular area R3. The same effect as that of the embodiment can be obtained using a backlight module capable of varying the amount of light for each area other than the rectangular area R3.

For example, in the tiling display 250 illustrated in FIG. 9, a first area R21 that needs to be made brighter than a second area R22 is present only on the inner side of each display panel 51 in the Y direction. Thus, in the modification illustrated in FIG. 9, a backlight module 252 is configured to be capable of varying an amount of light irradiated against the video display area R0 for each zonal area R24. As a result, the modification can make the first area R21 brighter than the second area R22 without using the backlight module 52 (refer to FIG. 5) of the embodiment described above.

The zonal area R24 is the area provided by dividing the video display area R0 in the Y direction. The first area R21 is the zonal area R24 (first zonal area) located on the border B side of the video display area R0. The second area R22 is the zonal areas R24 (second zonal area) other than the first zonal area in the multiple zonal areas R24 that configure the video display area R0. The zonal area R24 extends along the X direction, which is the video scanning direction. As a result, the backlight module 252 of the modification can control an amount of light irradiated against the zonal area R24 as a whole every time the video in the zonal area R24 is switched along the scanning direction, thereby making it possible to achieve light amount control that has less influence on the switching of the video.

The embodiment described above illustrates the configuration as illustrated in FIG. 2 that comprises the tiling display 150 in which the optical elements 30 are provided on the borders B of the four display panels 51. The technique of the embodiment is applicable to a tiling display in which no optical elements are provided on the borders.

The embodiment described above illustrates the configuration that comprises the backlight module 52 (refer to FIG. 5) capable of individually controlling the lighting values of the respective light-emitting elements 52a so as to make the first area R1 brighter than the second area R2. The use of the following backlight module can achieve the same effect as that of the embodiment without controlling the lighting values. Specifically, the use of a backlight module configured in such a manner that the number of light-emitting elements provided at positions corresponding to the first area is larger than the number of light-emitting elements provided at positions corresponding to the second area can achieve the same effect as that of the embodiment without controlling the lighting values.

The embodiment described above illustrates the configuration that comprises, as the light source module, the backlight module irradiating the display panel with light from the rear side of the display panel. As the light source module, an edge light module may be used that irradiates the display panel with light from the side of the display panel. In this case, the same effect as that of the embodiment can be achieved by providing an amount of light irradiated against the first area to be larger than an amount of light irradiated against the second area by an adjustment, as appropriate, of the number and sizes of holes of a light guiding plate that guides light from the edge light module to the display panel.

The embodiment described above illustrates the configuration in which the four display panels are each provided with the single backlight module. As another embodiment, a single backlight module may be shared by the four display panels.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video display device, comprising:
    a display panel that comprises a display module, the display module comprising a video display area capable of displaying video and a frame provided on an outer edge of the video display area, and the display panel being arranged adjacent to another display panel; a light source module that comprises a light source that irradiates the video display area with light, and is configured to control an amount of light irradiated against the video display area such that a first area located on a side of a border with the other display panel is brighter than a second area other than the first area in the video display area; and an optical element provided so as to correspond to the border and being configured to magnify video displayed on the outer edge toward the frame, wherein the light source module is configured to provide an amount of light irradiated against the first area larger than an amount of light irradiated against the second area such that brightness of the video viewed through the optical element and brightness of the video viewed without passing through the optical element are substantially equal to each other.

2. The video display device of claim 1, wherein the light source module is configured to be capable of controlling amount of light irradiated against the video display area such that the amount of light differs among a plurality of zonal areas provided by dividing the video display area in a direction orthogonal to a scanning direction of the video, and configured to provide an amount of light irradiated against a first one of the zonal areas corresponding to the first area to be larger than an amount of light irradiated against a second one of the zonal areas corresponding to the second area.

3. The video display device of claim 1, wherein the light source module is configured to be capable of controlling amount of light with which the video display area is irradiated such that the amount of light differs among a plurality of rectangular areas provided by dividing the video display area in a scanning direction of the video and a direction orthogonal to the scanning direction, and configured to provide an amount of light irradiated against a first one of the rectangular areas corresponding to the first area to be larger than an amount of light irradiated against a second one of the rectangular areas corresponding to the second area.

4. The video display device of claim 1, wherein the light source module is configured to be capable of setting an amount of light irradiated against a particular area in the video display area to be relatively large in accordance with an arrangement position of the display panel relative to the other display panel.

5. The video display device of claim 1, wherein
    the light source comprises a plurality of light-emitting elements that are provided so as to cover substantially the entire area of the video display area and configured to irradiate the display panel from a rear side of the display panel, and
    the light source module is configured to provide an amount of light irradiated against the first area to be larger than an amount of light irradiated against the second area by individually controlling lighting values of the light-emitting elements.

6. A display control method, comprising: controlling, in a video display area in a display panel arranged adjacent to another display panel, an amount of light irradiated against the video display area such that a first area located on a side of a border with the other display panel is brighter than a second area other than the first area; wherein: the display panel comprises a display module comprising the video display area and a frame provided on an outer edge of the video display area, an optical element is provided so as to correspond to the border and is configured to magnify video displayed on the outer edge toward the frame, and an amount of light irradiated against the first area is larger than an amount of light irradiated against the second area such that brightness of the video viewed through the optical element and the brightness of the video viewed without passing through the optical element are substantially equal to each other.

\* \* \* \* \*